US007697668B1

(12) United States Patent
Ostermann et al.

(10) Patent No.: US 7,697,668 B1
(45) Date of Patent: *Apr. 13, 2010

(54) SYSTEM AND METHOD OF CONTROLLING SOUND IN A MULTI-MEDIA COMMUNICATION APPLICATION

(75) Inventors: Joern Ostermann, Morganville, NJ (US); Mehmat Reha Civanlar, Middletown, NJ (US); Hans Peter Graf, Lincroft, NJ (US); Thomas M. Isaacson, Dunkirk, MD (US)

(73) Assignee: AT&T Intellectual Property II, L.P., New York, NY (US)

( * ) Notice: Subject to any disclaimer, the term of this patent is extended or adjusted under 35 U.S.C. 154(b) by 872 days.

This patent is subject to a terminal disclaimer.

(21) Appl. No.: 11/195,934

(22) Filed: Aug. 3, 2005

Related U.S. Application Data

(63) Continuation of application No. 09/999,526, filed on Nov. 2, 2001, now Pat. No. 6,963,839.

(60) Provisional application No. 60/245,521, filed on Nov. 3, 2000.

(51) Int. Cl.
*H04M 11/00* (2006.01)

(52) U.S. Cl. ....................... 379/100.08; 704/260; 704/6

(58) Field of Classification Search ................. 704/272, 704/276, 275, 270, 258, 260, 2, 6; 379/100.08
See application file for complete search history.

(56) References Cited

U.S. PATENT DOCUMENTS

| | | | |
|---|---|---|---|
| 4,276,570 A | | 6/1981 | Burson et al. |
| 4,602,280 A | | 7/1986 | Maloomian |
| 5,113,493 A | | 5/1992 | Crosby |
| 5,347,306 A | | 9/1994 | Nitta |
| 5,387,178 A | | 2/1995 | Moses |
| 5,416,899 A | | 5/1995 | Poggio et al. |
| 5,420,801 A | | 5/1995 | Dockter et al. |
| 5,537,662 A | | 7/1996 | Sato et al. |
| 5,546,500 A | * | 8/1996 | Lyberg ....................... 704/277 |
| 5,555,343 A | * | 9/1996 | Luther ........................ 704/260 |

(Continued)

FOREIGN PATENT DOCUMENTS

EP 849691 A2 6/1998

(Continued)

OTHER PUBLICATIONS

David Kurlander, Tim Skelly, David Salesin. "Comic Chat", Proceedings of the 23rd annual conference on Computer graphics and interactive techniques, Aug. 1996.*

(Continued)

*Primary Examiner*—Olisa Anwah

(57) ABSTRACT

A computing device and computer-readable medium storing instructions for controlling a computing device to customize a voice in a multi-media message created by a sender for a recipient, the multi-media message comprising a text message from the sender to be delivered by an animated entity. The instructions comprise receiving from the sender inserted voice emoticons, which may be repeated, into the text message associated with parameters of a voice used by an animated entity to deliver the text message; and transmitting the text message such that a recipient device can deliver the multi-media message at a variable level associated with a number of times a respective voice emoticon is repeated.

20 Claims, 8 Drawing Sheets

U.S. PATENT DOCUMENTS

| | | | | |
|---|---|---|---|---|
| 5,555,426 | A | 9/1996 | Johnson et al. | |
| 5,613,056 | A | 3/1997 | Gasper et al. | |
| 5,630,017 | A | 5/1997 | Gasper et al. | |
| 5,638,502 | A | 6/1997 | Murata | |
| 5,640,590 | A * | 6/1997 | Luther | 715/500.1 |
| 5,647,834 | A | 7/1997 | Ron | |
| 5,657,426 | A * | 8/1997 | Waters et al. | 704/276 |
| 5,659,692 | A | 8/1997 | Poggio et al. | |
| 5,680,481 | A | 10/1997 | Prasad et al. | |
| 5,689,618 | A | 11/1997 | Gasper et al. | |
| 5,697,789 | A | 12/1997 | Sameth et al. | |
| 5,732,232 | A | 3/1998 | Brush et al. | |
| 5,745,360 | A | 4/1998 | Leone et al. | |
| 5,781,186 | A | 7/1998 | Jennings | |
| 5,818,461 | A | 10/1998 | Rouet et al. | |
| 5,826,234 | A | 10/1998 | Lyberg | |
| 5,832,115 | A | 11/1998 | Rosenberg | |
| 5,848,396 | A | 12/1998 | Gerace | |
| 5,850,463 | A | 12/1998 | Horii | |
| 5,852,669 | A | 12/1998 | Eleftheriadis et al. | |
| 5,857,099 | A | 1/1999 | Mitchell et al. | |
| 5,860,064 | A | 1/1999 | Henton | |
| 5,880,731 | A | 3/1999 | Liles et al. | |
| 5,881,731 | A | 3/1999 | Liles et al. | |
| 5,889,892 | A | 3/1999 | Saito | |
| 5,933,151 | A | 8/1999 | Jayant et al. | |
| 5,936,628 | A | 8/1999 | Kitamura et al. | |
| 5,950,163 | A | 9/1999 | Matsumoto | |
| 5,969,721 | A | 10/1999 | Chen et al. | |
| 5,970,173 | A | 10/1999 | Lee et al. | |
| 5,970,453 | A | 10/1999 | Sharman | |
| 5,982,853 | A | 11/1999 | Liebermann | |
| 5,983,190 | A | 11/1999 | Trower et al. | |
| 5,995,639 | A | 11/1999 | Kado et al. | |
| 6,002,997 | A | 12/1999 | Tou | |
| 6,011,537 | A | 1/2000 | Slotznick | |
| 6,014,634 | A | 1/2000 | Scroggie et al. | |
| 6,014,689 | A | 1/2000 | Budge et al. | |
| 6,018,744 | A | 1/2000 | Mamiya et al. | |
| 6,018,774 | A | 1/2000 | Mayle et al. | |
| 6,064,383 | A | 5/2000 | Skelly | |
| 6,068,183 | A | 5/2000 | Freeman et al. | |
| 6,069,622 | A | 5/2000 | Kurlander | |
| 6,075,857 | A | 6/2000 | Doss et al. | |
| 6,075,905 | A | 6/2000 | Herman et al. | |
| 6,078,700 | A | 6/2000 | Sarachik | |
| 6,088,040 | A | 7/2000 | Oda et al. | |
| 6,111,590 | A | 8/2000 | Boezeman et al. | |
| 6,122,606 | A | 9/2000 | Johnson | |
| 6,147,692 | A | 11/2000 | Shaw et al. | |
| 6,166,744 | A | 12/2000 | Jaszlics et al. | |
| 6,208,359 | B1 | 3/2001 | Yamamoto | |
| 6,215,505 | B1 | 4/2001 | Minami et al. | |
| 6,219,638 | B1 | 4/2001 | Padmanabhan et al. | |
| 6,225,978 | B1 | 5/2001 | McNeil | |
| 6,230,111 | B1 | 5/2001 | Mizokawa | |
| 6,232,966 | B1 | 5/2001 | Kurlander | |
| 6,243,681 | B1 | 6/2001 | Guji et al. | |
| 6,289,085 | B1 | 9/2001 | Miyashita et al. | |
| 6,307,567 | B1 | 10/2001 | Cohen-Or | |
| 6,329,994 | B1 | 12/2001 | Gever et al. | |
| 6,332,038 | B1 | 12/2001 | Funayama et al. | |
| 6,343,141 | B1 | 1/2002 | Okada et al. | |
| 6,366,286 | B1 | 4/2002 | Hermanson | |
| 6,366,949 | B1 | 4/2002 | Hubert | |
| 6,377,925 | B1 | 4/2002 | Greene et al. | |
| 6,381,346 | B1 | 4/2002 | Erasian | |
| 6,384,829 | B1 | 5/2002 | Prevost et al. | |
| 6,385,586 | B1 | 5/2002 | Dietz | |
| 6,393,107 | B1 | 5/2002 | Ball et al. | |
| 6,405,225 | B1 | 6/2002 | Apfel et al. | |
| 6,417,853 | B1 | 7/2002 | Squires et al. | |
| 6,433,784 | B1 | 8/2002 | Merrick et al. | |
| 6,434,597 | B1 | 8/2002 | Hachiya et al. | |
| 6,449,634 | B1 | 9/2002 | Capiel | |
| 6,453,294 | B1 * | 9/2002 | Dutta et al. | 704/270.1 |
| 6,460,075 | B2 | 10/2002 | Kruger et al. | |
| 6,462,742 | B1 | 10/2002 | Rose et al. | |
| 6,466,205 | B2 | 10/2002 | Simpson et al. | |
| 6,466,213 | B2 | 10/2002 | Bickmore et al. | |
| 6,476,815 | B1 | 11/2002 | Ando | |
| 6,496,868 | B2 | 12/2002 | Krueger et al. | |
| 6,522,333 | B1 * | 2/2003 | Hatlelid et al. | 345/474 |
| 6,532,011 | B1 | 3/2003 | Francini et al. | |
| 6,535,907 | B1 | 3/2003 | Hachiya et al. | |
| 6,539,354 | B1 * | 3/2003 | Sutton et al. | 704/260 |
| 6,542,936 | B1 | 4/2003 | Mayle et al. | |
| 6,545,682 | B1 | 4/2003 | Ventrella et al. | |
| 6,553,341 | B1 | 4/2003 | Mullaly et al. | |
| 6,606,096 | B2 | 8/2003 | Wang | |
| 6,631,399 | B1 | 10/2003 | Stanczak et al. | |
| 6,643,385 | B1 | 11/2003 | Bravomalo | |
| 6,654,018 | B1 | 11/2003 | Cosatto et al. | |
| 6,665,860 | B1 | 12/2003 | DeSantis et al. | |
| 6,680,934 | B1 | 1/2004 | Cain | |
| 6,692,359 | B1 | 2/2004 | Williams et al. | |
| 6,766,299 | B1 | 7/2004 | Bellomo et al. | |
| 6,782,431 | B1 | 8/2004 | Mukherjee et al. | |
| 6,784,901 | B1 | 8/2004 | Harvey et al. | |
| 6,801,931 | B1 | 10/2004 | Ramesh et al. | |
| 6,833,845 | B2 | 12/2004 | Kitagawa et al. | |
| 6,919,892 | B1 | 7/2005 | Cheiky et al. | |
| 6,963,839 | B1 | 11/2005 | Ostermann et al. | |
| 6,987,535 | B1 | 1/2006 | Matsugu et al. | |
| 6,990,452 | B1 | 1/2006 | Ostermann et al. | |
| 7,177,811 | B1 | 2/2007 | Ostermann et al. | |
| 7,203,648 | B1 | 4/2007 | Ostermann et al. | |
| 7,203,759 | B1 | 4/2007 | Ostermann et al. | |
| 2001/0019330 | A1 * | 9/2001 | Bickmore et al. | 345/473 |
| 2001/0049596 | A1 * | 12/2001 | Lavine et al. | 704/9 |
| 2001/0050681 | A1 | 12/2001 | Keys et al. | |
| 2001/0050689 | A1 | 12/2001 | Park | |
| 2002/0007276 | A1 | 1/2002 | Rosenblatt et al. | |
| 2002/0109680 | A1 | 8/2002 | Orbanes et al. | |
| 2002/0176604 | A1 | 11/2002 | Shekhar et al. | |
| 2002/0194006 | A1 * | 12/2002 | Challapali | 704/276 |
| 2003/0028378 | A1 * | 2/2003 | August et al. | 704/260 |
| 2003/0046160 | A1 * | 3/2003 | Paz-Pujalt et al. | 704/14 |
| 2003/0046348 | A1 | 3/2003 | Pinto et al. | |
| 2003/0191816 | A1 * | 10/2003 | Landress et al. | 709/219 |
| 2004/0091154 | A1 | 5/2004 | Cote | |
| 2005/0091305 | A1 | 4/2005 | Lange et al. | |
| 2007/0033259 | A1 | 2/2007 | Wies et al. | |

FOREIGN PATENT DOCUMENTS

| | | | |
|---|---|---|---|
| EP | 849692 | A2 | 6/1998 |
| JP | 2003033575 | A | 2/2003 |
| KR | 2002016482 | A | 3/2002 |

OTHER PUBLICATIONS

Pollack, "Happy in the East or Smiling in the West". New York Times. Aug. 12, 1996.

Pelachaud et al., "Generating Facial Expressions for Speech". Cognitive Science. Jan. 3, 1996. vol. 20, No. 1, pp. 1-46.

W. Keith Edwards, "The Design and Implementation of the Montage Multimedia Mail System", Apr. 1991, IEEE Conference Proceedings of TRICOMM '91, pp. 47-57.

Ming Ouhyoung et al "Web-enabled Speech Driven Facial Animation", Proc. of ICAT'99 (Int'l Conference on Artificial Reality and Tele-existance), pp. 23-28, Dec. 1999, Tokyo, Japan.

H. Noot, ZS. M. Rutkay, Chartoon 20.0 Manual, Jan. 31, 2000.

Lijun Yin, A. Basu; "MPEG4 face modeling using fiducial points", IEEE; Image Processing, 1997. Proceedings, International Conference on vol. 1, 26-29, 1997.
Bickmore, et al., "Animated Autonomous Personal Representatives", ACM, International Conference on Autonomous Agents, Proceedings of the Second International Conference on Autonomous Agents, pp. 8-15, 1998.
Thorisson, Kristinn R. "ToonFace: A System for Creating and Animating Interactive Cartoon Faces." MIT Media Laboratory Learning and Common Sense Section Technical Report, pp. 96-101, Apr. 1996.
Jian-Gang Wang et al."Morphology-based front-view facial contour detection", IEEE Int'l Conf on Systems, Man and Cybernetics, vol. 4, Oct. 2000, pp. 2775-2780.
Naka, T., et al., "A compression/decompression method for streaming based humanoid animation", Proceedings of Fourth Symposium on Virtual Reality Modeling Language, Feb. 23-26, 1999, VRML '99, ACM Press, NY, NY, pp. 63-70.
Perlin, K. et al., "Improv: a system for scripting interactive actors in virtual worlds", Proceedings of the 23rd Annual Conference on Computer Graphics and interactive Techniques, SIGGRAPH '96, ACM Press, NY, NY, pp. 205-216.
Pighin, F., et al., "Synthesizing realistic facial expressions from photographs", Proceedings of the 25th Annual Conference on Computer Graphics and interactive Techniques, SIGGRAPH '96, ACM Press, NY, NY, pp. 75-84.
Marks et al., "Fuzzy and extra crisp alternating projection onto convex sets (POCS)", Proceedings IEEE International Conference on Fuzzy Systems, vol. 2, Mar. 20-24, 1995, pp. 427-435 vol. 2.
Zs. Ruttkay, P. ten Hagen, H. Noot, and M. Savenije, Facial animation by synthesis of captured and artificial data, CAPtech '98 proceedings, 1998.
J. Hendrix, et al., "A facial repertoire for avatars", Proceedings of the Workshop "Interacting Agents", Enschede, The Netherlands, 2000, pp. 1-20.
Chua, C; Neumann, U., "A layered approach to deformable modeling and animation", Proceedings of the Fourteenth Conference on Computer Animation, Nov. 7-8, 2001, pp. 184-191.
Business Editors, & High-Tech Writers, "Life F/X Inc. Introduces Strategy for Web Success", Business Wire, New York: Feb. 1, 2000. pp. 1-3.

* cited by examiner

SYSTEM AND METHOD OF CONTROLLING SOUND IN A MULTI-MEDIA COMMUNICATION APPLICATION

PRIORITY APPLICATION

The present application claims priority to U.S. patent application Ser. No. 09/999,526 filed Nov. 2, 2001, which claims priority to U.S. Provisional Application No. 60/245,521 filed Nov. 3, 2000, the contents of which are incorporated herein.

RELATED APPLICATIONS

The present application is related to the following U.S. patent applications: Ser. No. 10/003,094 entitled "System and Method for Sending Multi-Media Message With Customized Audio"; Ser. No. 10/003,091 entitled "System and Method for Receiving Multi-Media Messages"; Ser. No. 10/003,350 entitled "System and Method for Sending Multi-Media Messages Using Emoticons"; Ser. No. 10/003,093 entitled "System and Method for Sending Multi-Media Messages Using Customizable Background Images"; Ser. No. 10/003,092 entitled "System and Method of Customizing Animated Entities for Use in a Multi-Media Communication Application"; Ser. No. 09/999,525 entitled "System and Method of Marketing Using a Multi-Media Communication System"; and Ser. No. 09/999,505 entitled "A System and Method of Providing Multi-Cultural Multi-Media Messages." These applications, filed concurrently herewith and commonly assigned, are incorporated herein by reference.

BACKGROUND OF THE INVENTION

1. Field of the Invention

The present invention relates to multi-media messages and more specifically to a system and method of customizing the audio portion of creating multi-media messages.

2. Discussion of Related Art

There is a growing popularity for text-to-speech ("TTS") enabled systems that combine voice with a "talking head" or a computer-generated face that literally speaks to a person. Such systems improve user experience with a computer system by personalizing the exchange of information. Systems for converting text into speech are known in the art. For example, U.S. Pat. No. 6,173,263 B1 to Alistair Conkie, assigned to the assignee of the present invention, discloses a system and method of performing concatenative speech synthesis. The contents of this patent are incorporated herein by reference.

One example associated with the creation and delivery of e-mails using a TTS system is LifeFX™'s facemail™. FIG. 1 illustrates how a sender creates a message using the LifeFX™ system. A window 10 presents fields for inserting the sender's e-mail address 12 and the recipient's e-mail address 14. Standard features such as control buttons 16 for previewing and delivering the message are provided. A standard subject line 18 is also provided. The sender chooses from a variety of faces 20 to deliver the message. The currently chosen face 22 appears in the window 10 as well. The sender inserts the message text as with a traditional e-mail in a text area 24 and a box 26 below the text area gives illustrations of some of the available emoticons, explained further below.

This system enables a sender to write an e-mail and choose a talking head or "face" to deliver the e-mail. The recipient of the e-mail needs to download special TTS software in order to enable the "face" to deliver the message. The downloaded software converts the typewritten e-mail from the e-mail sender into audible words, and synchronizes the head and mouth movements of the talking head to match the audibly spoken words. Various algorithms and software may be used to provide the TTS function as well as the synchronization of the speech with the talking head. For example, the article, "Photo-reahstic Talking-heads From Image Samples," by E. Cosatto and H. P. Graf, *IEEE Transactions on Multimedia*, September 2000, Vol. 2, Issue 3, pages 152-163, describes a system for creating a realistic model of a head that can be animated and lip-synched from phonetic transcripts of text. The contents of this article are incorporated herein by reference. Such systems, when combined with TTS synthesizers, generate video animations of talking heads that resemble people. One drawback of related systems is that the synthesized voice bears no resemblance to the sender voice.

The LifeFX™ system presents the user with a plurality of faces 20 from which to choose. Once a face is chosen, the e-mail sender composes an e-mail message. Within the e-mail, the sender inserts features to increase the emotion showed by the computer-generated face when the e-mail is "read" to the e-mail recipient. For example, the following will result in the message being read with a smile at the end: "Hi, how are you today?:-)". These indicators of emotion are called "emoticons" and may include such features as: :-((frown); -o (wow); :-x (kiss); and ;-) (wink). The e-mail sender will type in these symbols which are translated by the system into the emotions. Therefore, after composing a message, inserting emoticons, and choosing a face, the sender sends the message. The recipiant will get an e-mail with a notification that he or she has received a facemail and that they will need to download a player to hear the message.

The LifeFX™ system presents its emoticons when delivering the message in a particular way. For example, when an emoticon such as a smile is inserted in the sentence "Hi, Jonathon, :-) how are you today?" the "talking head" 22 speaks the words "Hi, Jonathan" and then stops talking and begins the smiling operation. After finishing the smile, the talking head completes the sentence "how are you today?"

The LifeFX™ system only enables the recipient to hear the message after downloading the appropriate software. There are several disadvantages to delivering multi-media messages in this manner. Such software requires a large amount of disc space and the recipient may not desire to utilize his or her space with the necessary software. Further, with viruses prevalent on the Internet, many people are naturally reluctant to download software when they are unfamiliar with its source.

FIG. 2 illustrates a received facemail™ 40. The chosen talking head 22 delivers the message. Buttons such as "say again" 42, "new" 44, "forward" 26, "reply" 48, "reply all" 50, and "show text" 52 enable the recipient to control to some degree how the message is received. Buttons 42, 44, 46, 48 and 50 are commonly used button features for controlling messages. Button 52 allows the user to read the text of the message. When button 52 is clicked, the text of the message is shown in a window illustrated in FIG. 3. A separate window 54 pops up typically over the talking head 22 with the text. When the window is moved or does not cover the talking head, the sound continues but if the mouth of the talking head is showing, it is clear that when the text box is up, the mouth stops moving.

SUMMARY OF THE INVENTION

What is needed in the art is a system and method of enabling the sender to control the animated entity's voice when delivering the multi-media message. The prior art fails to provide the sender with any voice options and such options may be advantageous and increase the sender's use of the multi-media message system. Often, the sender chooses an animated entity because of the image but the sender dislikes the particular voice. Or the sender may want a particular animated entity for a humorous effect, such as choosing a cowboy animated entity but choosing a high-pitched voice. An advantage of presenting the sender with voice modification options is that the sender may further create a multi-media message that conveys the appropriate message as desired by the sender.

An embodiment of the present invention relates to a method for customizing a voice in a multi-media message created by a sender for a recipient, the multi-media message comprising a text message from the sender to be delivered by an animated entity. The method comprises presenting the option to the sender to insert voice emoticons into the text message associated with parameters of a voice used by the animated entity to deliver the text message. The message is then delivered wherein the voice of the animated entity is modified throughout the message according to the voice emoticons.

Some of the available voice emoticons may comprise emoticons associated with voice stress, volume, pause, and emotion. For example, a yelling voice emoticon or a whispering voice emoticon may be used. The voice emoticons are chosen by the sender and inserted into the text of the message. There are a variety of ways to associate any particular voice emoticon with words before and after the emoticon. For example, the effect on the animated entity's voice due to a voice emoticon associated with a high volume may begin the word prior to the voice emoticon and end on the word after the voice emoticon, or the sender may indicate a period of time before and after the emoticon during which the effect of the increase in volume or other feature associated with the emoticon is exhibited.

A volume or intensity of the voice emoticons may be given effect by repeating the emoticons. In this case, delivering the multi-media message further comprises delivering the multi-media message at a variable level associated with a number of times a respective voice emoticon is repeated. In this manner, the sender may control the presentation of the message to increase the overall effectiveness of the multi-media message.

In another aspect of the invention, templates are presented to the sender to choose specific sounds, such as a crash or glass breaking, or audio tracks to insert into the message. The tracks may be organized in any manner such as by specific song, by general description of music such as Classic Rock or country, or by artists such as James Taylor. Amplitude adjustments and duration adjustments are also available to the user via the template or via start and stop tags inserted for controlling the starting point and specific stopping point of musical selections. Using the amplitude option, the music may be soft, as background music, or louder for any effect desired by the sender.

Various audio track tags may also be chosen by the sender to further enhance the presentation of the audio tracks. These tags (not shown) may relate to, for example, duration, intensity, looping (automatic replay of selection), mixing, volume, or tempo. Once the audio sound or audio track is inserted and any tags or other parameter controls of the audio track are inserted by the sender, the method according to this aspect of the invention comprises delivering the multi-media message with audio tracks according to the audio track tags inserted within the text message by the sender.

Audio tracks may also be available to the sender via a predefined message template. Such a template may comprise, for example, a specific background image and background audio tracks predefined according to a general tone the sender wishes to convey in the multi-media message. For example, a love letter may comprise soft music with a background image of a beach at sunset. The chosen animated entity may also have a predefined voice and face to match the template. The sender can choose the template with these parameters, modify any of the parameters to further personalize the template, and then send the multi-media message to the recipient. The present invention enables the sender to personalize and creatively add or modify the voice of the animated entity or any sound associated with the message.

BRIEF DESCRIPTION OF THE DRAWINGS

The foregoing advantages of the present invention will be apparent from the following detailed description of several embodiments of the invention with reference to the corresponding accompanying drawings, of which:

FIG. 4(*b*) illustrates a low-bandwidth version of the system shown in FIG. 4(*a*);

DETAILED DESCRIPTION OF THE INVENTION

The present invention may be best understood with reference to the accompanying drawings and description herein. The basic system design supporting the various embodiments of the invention is first disclosed. A system comprises a TTS and an animation server to provide a multi-media message service over the Internet wherein a sender can create a multi-media message presentation delivered audibly by an animated entity.

Figure 1:
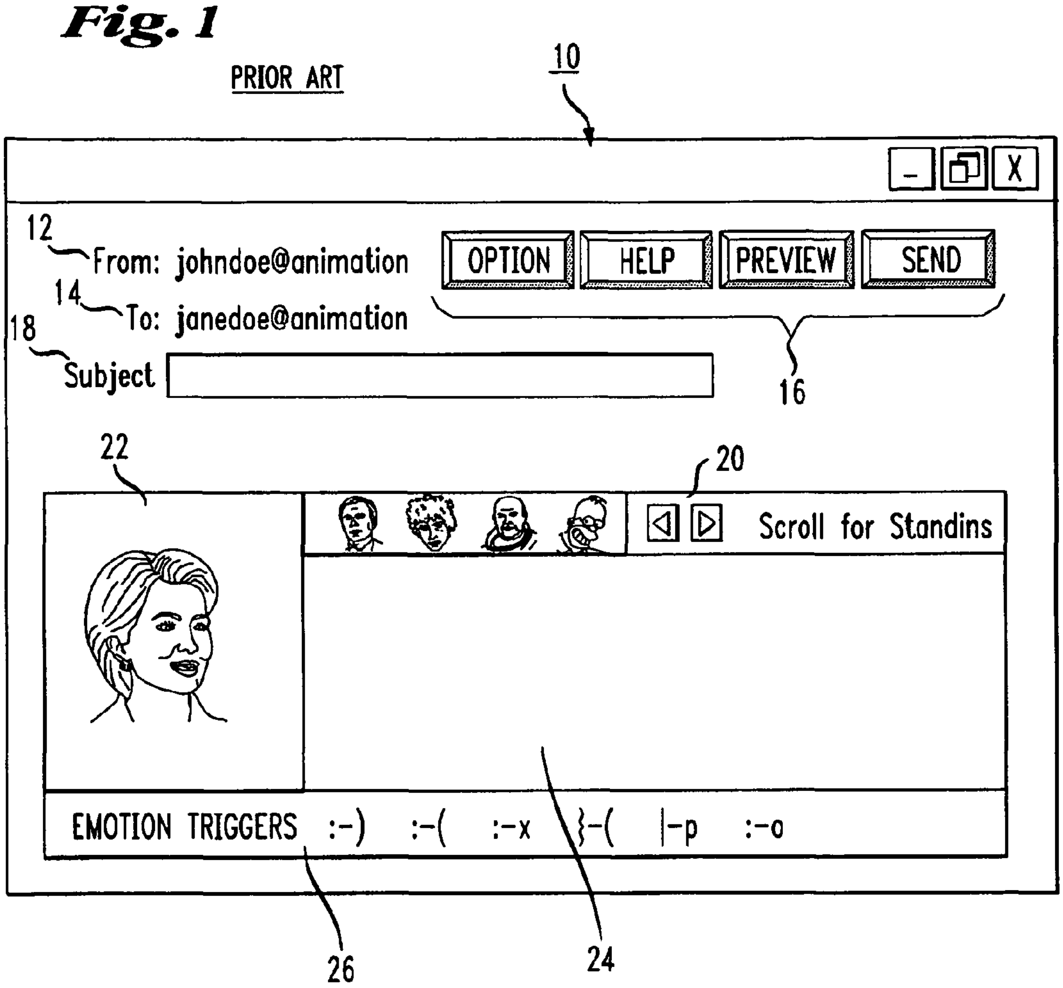
Fig. 1 PRIOR ART
FIG. 1 illustrates a prior art window for creating a multi-media message.
Figure 2:
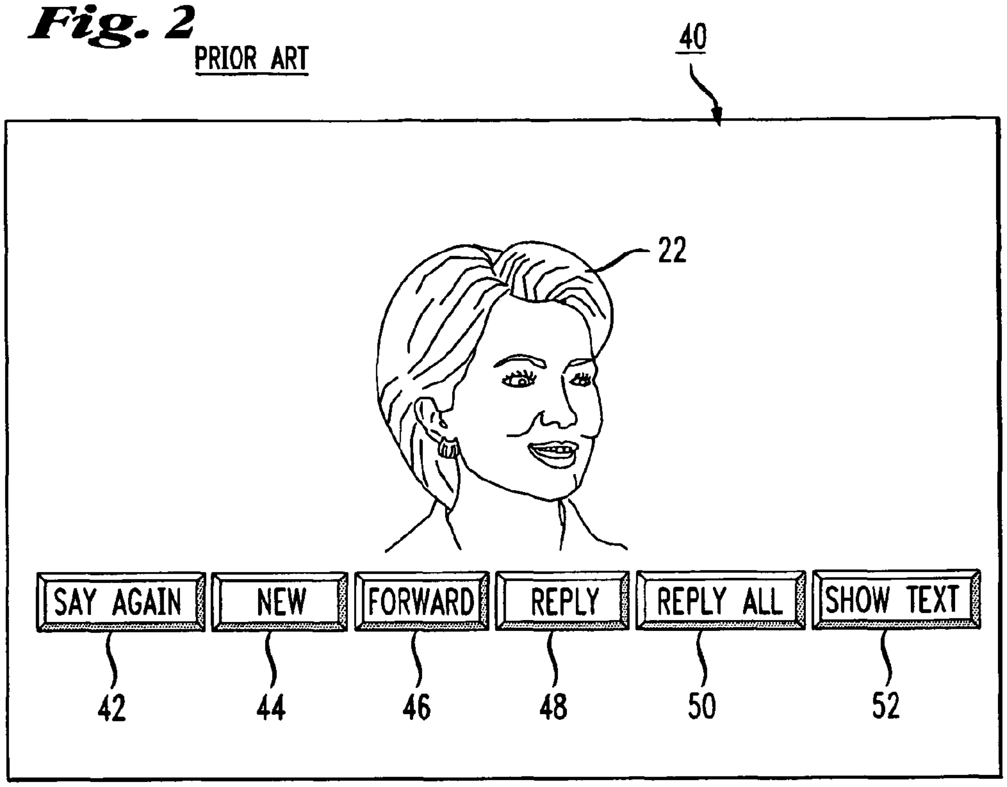
Fig. 2 PRIOR ART
FIG. 2 illustrates a prior art window viewed by a recipient of a multi-media message.
Figure 3:
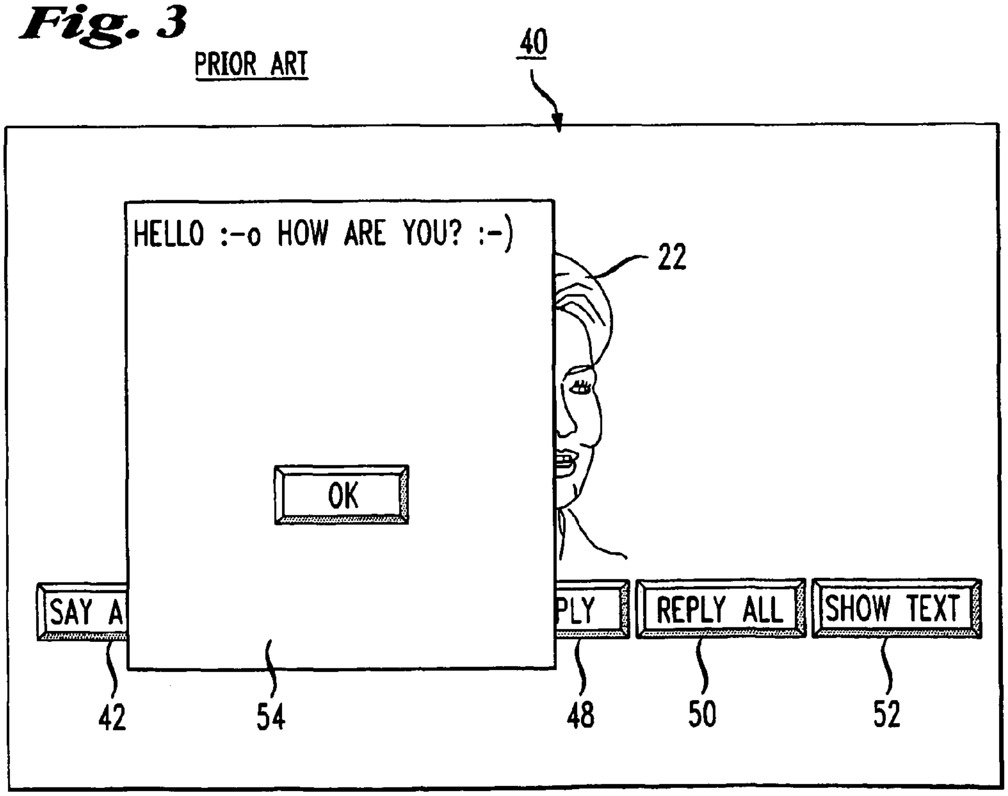
Fig. 3 PRIOR ART
FIG. 3 illustrates a prior art window in response to a recipient of a multi-media message clicking on a "show text" button.
Figure 4A:
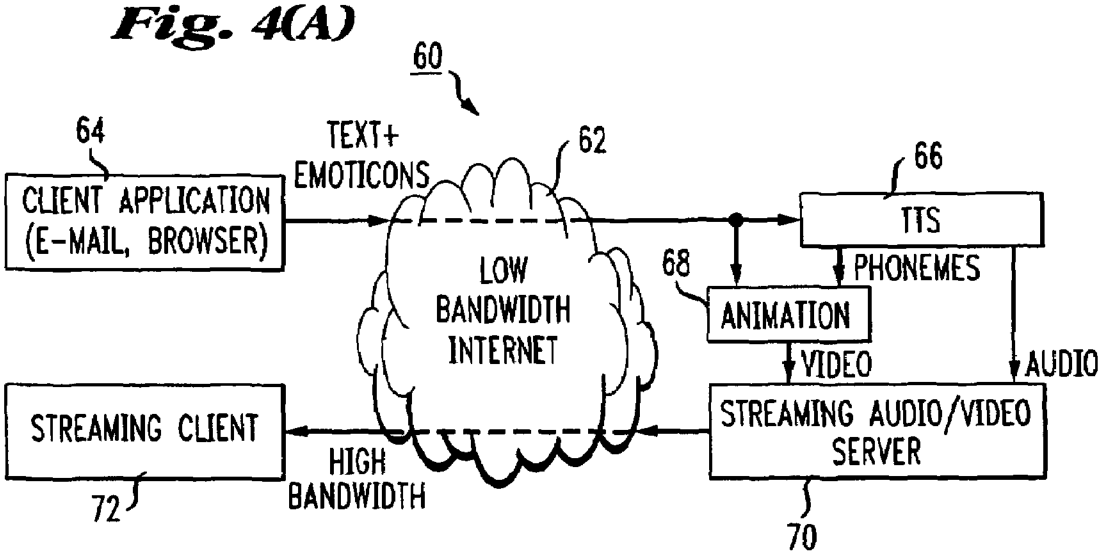
FIG. 4(*a*) illustrates the basic architecture of the system according to an embodiment of the present invention.
Figure 4B:
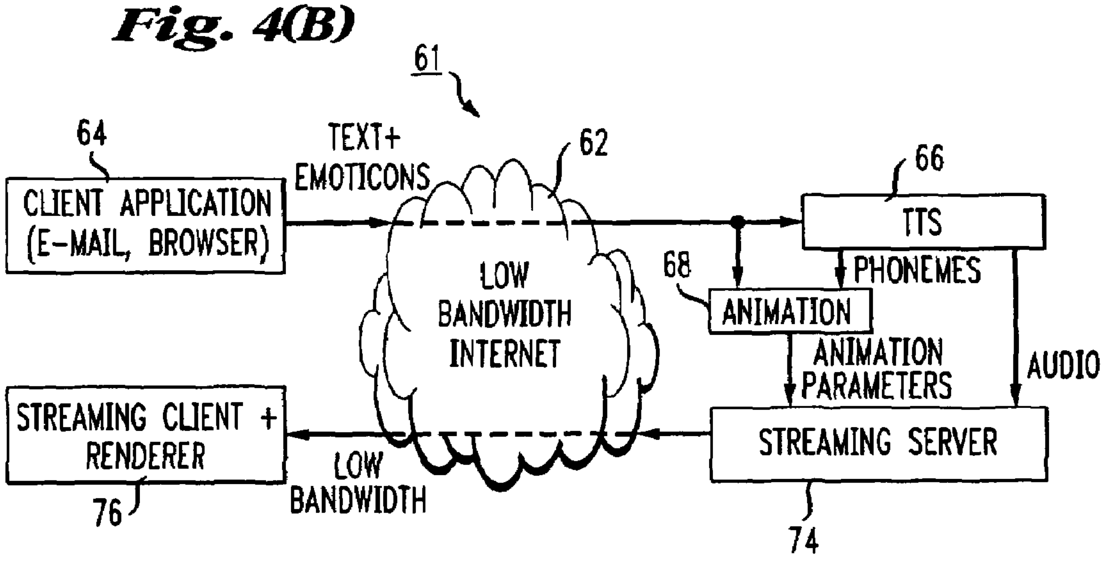

FIG. 4(*a*) illustrates a high-bandwidth architecture 60 associated with the embodiments of the invention. The system 60 delivers a hyper-text mark-up language (HTML) page through the Internet 62 (connected to a web server, not shown but embodied in the Internet 62) to a client application 64. The HTML page (shown by way of example in FIG. 6) enables the sender to create a multi-media message. The client application may be, for example, a web browser such as Microsoft's Internet Explorer®. Other client applications include e-mail and instant messaging clients. The sender creates the multi-media message using the HTML page.

The web server receives the composed multi-media message, which includes several components that are additional to a regular e-mail or instant message. For example, a multi-media message includes a designation of an animated entity for audibly delivering the message and emoticons that add emotional elements to the animated entity during the delivery of the message. The HTML page delivered to the client terminal enables the sender to manipulate various buttons and inputs to create the multi-media message.

Once the sender finishes creating the multi-media message and sends the message, the Internet 62 transmits the message text with emoticons and other chosen parameters to a text-to-speech (TTS) server 66 that communicates with an animation or face server 68 to compute and synchronize the multi-media message. The transmission of the text-to-speech data may be accomplished using such methods as those disclosed in U.S. Pat. No. 6,173,250 B1 to Kenneth Jong, assigned to the assignee of the present invention. The contents of this patent are incorporated herein by reference.

The animation server 68 receives phonemes associated with the sender message and interpreted by the TTS server 66, including the text of the subject line and other text such as the name of the sender, as well as other defined parameters or data. The animation server 68 processes the received phonemes, message text, emoticons and any other provided parameters such as background images or audio and creates an animated message that matches the audio and the emoticons. An exemplary method for producing the animated entity is disclosed in U.S. Pat. No. 5,995,119 to Cosatto et al. ("Cosatto et al."). The Cosatto et al. patent is assigned to the assignee of the present invention and its contents are incorporated herein by reference. Cosatto et al. disclose a system and method of generating animated characters that can "speak" or "talk" received text messages. Another reference for information on generating animated sequences of animated entities is found in U.S. Pat. No. 6,122,177 to Cosatto et al. ("Cosatto et al. II"). The contents of Cosatto et al. II are incorporated herein by reference as well.

The system 60 encodes the audio and video portions of the multi-media message for streaming through a streaming audio/video server 70. In a high-bandwidth version of the present invention, as shown in FIG. 4(*a*), the server 70 streams the multi-media message to the streaming client 72 over the Internet 62. One of ordinary skill in the art will understand and be cognizant of a variety of TTS servers and TTS technologies that may be optimally used for converting the text to speech. The particular implementation of TTS technologies is not relevant to the present invention. One of ordinary skill in the art will understand and be cognizant of a variety of animation servers and animation technologies that may be optimally used for converting phonemes and emoticons into talking entities, preferably faces. The particular implementation of animation technologies is not relevant to the present invention.

FIG. 4(*b*) illustrates a low-bandwidth system 61 of the present invention. In this variation, the animation server 68 produces animation parameters that are synchronized with the audio produced from the TTS server 66. The audio and animation parameters are encoded and transmitted by the streaming server 74 over a lower bandwidth connection over the Internet 62. The streaming client 76 in this aspect of the invention differs from the streaming client 72 of FIG. 4(*a*) in that client 76 includes rendering software for rendering the animation on the client device using the streamed animation parameters provided from the streaming server 74. Furthermore, the client includes a TTS synthesizer that synthesizes the audio. In this manner, the systems disclosed in FIGS. 4(*a*) and 4(*b*) provide both a high-bandwidth and a low-bandwidth option for all users.

A further variation of the invention applies when the client device includes the animation or rendering software. In this case, the client device 72, 76 can receive a multi-media message e-mail, with the message declared as a specific multi-purpose Internet mail extension (MIME) type, and render the animation locally without requiring access to a central server or streaming server 70, 74. In one aspect of the invention, the rendering software includes a TTS synthesizer with the usable voices. In this case, the recipient device 72, 76 receives the text (very little data) and the face model (several kb), unless it is already stored in a cache at the receiver device 72, 76. If the receiver device 72, 76 is requested to synthesize a voice different from the ones available at its TTS synthesizer, the server 74 downloads the new voice.

High quality voices typically require several megabytes of disk space. Therefore, if the voice is stored on a streaming server 74, in order to avoid the delay of the huge download, the server 74 uses a TTS synthesizer to create the audio. Then, the server 74 streams the audio and related markup information such as phonemes, stress, word-boundaries, bookmarks with emoticons, and related timestamps to the recipient. The recipient device 76 locally renders the face model using the face model and the markup information and synchronously plays the audio streamed from the server.

Figure 5:
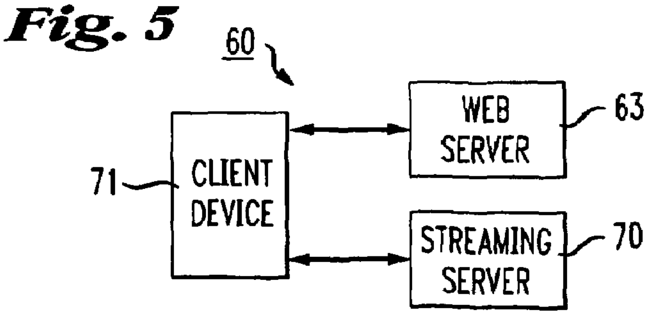
FIG. 5 shows example architecture for delivering the multi-media message.

When the recipient receives an e-mail message associated with the multi-media message, the message is received on a client device 71 such as that shown in FIG. 5. FIG. 5 illustrates a different view of system 60. The client device may be any one of a desktop, laptop computer, a wireless device such as a cell phone, 3Com's Palmpilot® or personal data assistant and the like. The particular arrangement of the client device 71 is unimportant to the present invention. The multi-media message may be delivered over the Internet, via a wireless communication system such as a cellular communication system or via a satellite communication system.

The multi-media message delivery mechanism is also not limited to an e-mail system. For example, other popular forms of communication include instant messaging, bulletin boards, I Seek You (ICQ) and other messaging services. Instant messaging and the like differ from regular e-mail in that its primary focus is immediate end-user delivery. In this sense, the sender and recipient essentially become interchangeable because the messages are communicated back and forth in real time. Presence information for a user with an open session to a well-known multi-user system enables friends and colleagues to instantly communicate messages back and forth. Those of skill in the art know various architectures for simple instant messaging and presence awareness/notification. Since the particular embodiment of the instant message, bulletin board, or I Seek You (ICQ) or other messaging service is not relevant to the general principles of the present invention, no further details are provided here. Those of skill in the art will understand and be able to apply the principles disclosed herein to the particular communication application. Although the best mode and preferred embodiment of the invention relates to the e-mail context, the multi-media messages may be created and delivered via any messaging context.

For instant messaging, client sessions are established using a multicast group (more than 2 participants) or unicast (2 participants). As part of the session description, each participant specifies the animated entity representing him. Each participant loads the animated entity of the other participants. When a participant sends a message as described for the e-mail application, this message is sent to a central server that animates the entity for the other participants to view or streams appropriate parameters (audio/animation parameters or audio/video or text/animation parameters or just text) to the participants that their client software uses to render the animated entity.

Further as shown in FIG. 5, when a client device 71 receives a request from the recipient to view a multi-media message, the client device 71 sends a hypertext transfer protocol (HTTP) message to the web server 63. As a response, the web server sends a message with an appropriate MIME type pointing to the server 70 at which point the server 70 streams the multi-media message to the client terminal for viewing and listening. This operation is well known to those of skill in the art.

In an alternate aspect of the invention, the client device 71 stores previously downloaded specific rendering software for delivering multi-media messages. As discussed above, LifeFX™ requires the recipient to download its client software before the recipient may view the message. Therefore, some of the functionality of the present invention is applied in the context of the client terminal 71 containing the necessary software for delivering the multi-media message. In this case, the animation server 68 and TTS server 66 create and synchronize the multi-media message for delivery. The multi-media message is then transmitted, preferably via e-mail, to the recipient. When the recipient opens the e-mail, an animated entity shown in the message delivery window delivers the message. The local client software runs to locally deliver the message using the animated entity.

Many web-based applications require client devices to download software on their machines, such as with the LifeFX™ system. As mentioned above, problems exist with this requirement since customers in general are reluctant and rightfully suspicious about downloading software over the Internet because of the well-known security problems such as virus contamination, trojan horses, zombies, etc. New software installations often cause problems with the existing software or hardware on the client device. Further, many users do not have the expertise to run the installation process if it gets even slightly complicated e.g., asking about system properties, directories, etc. Further, downloading and installing software takes time. These negative considerations may prevent hesitant users from downloading the software and using the service.

Some Java-based applications are proposed as a solution for the above-mentioned problems but these are more restrictive due to security precautions and can't be used to implement all applications and there is no unified Java implementation. Therefore, users need to configure their browsers to allow Java-based program execution. As with the problems discussed above, a time-consuming download of the Java executable for each use by users who do not know if they really need or like to use the new application may prevent users from bothering with the Java-based software.

Accordingly, an aspect of the present invention includes using streaming video to demonstrate the use of a new software application. Enabling the user to preview the use of a new software application solves the above-mentioned these problems for many applications. Currently, almost all client machines have a streaming video client such as Microsoft's Mediaplayer® or Real Player®. If not, such applications can be downloaded and configured with confidence. Note that the user needs to do this only once. These streaming video receivers can be used to receive and playback video on the client's machine.

According to this aspect of the present invention, shown by way of example in FIG. 5, a user may wish to preview a multi-media message before downloading rendering software on the client device 71. If such is the case, the user enters into a dialogue with the streaming server 70 and requests a preview or demonstration of the capabilities of the application if the rendering software were downloaded. The streaming server 70 transmits to the client device 71 a multi-media message showing dynamic screen shots of the application as if it is running on the user's machine. As an example, if the new application would have the capability to show a three-dimensional view of a room based on vector graphics, the streaming video displays the three-dimensional output of the application on the user's monitor as video. Most existing players allow the users to control the video playback by clicking on buttons or the like on an HTML page. This provides an interactive feeling for the user if needed without loading any new or suspicious software.

Therefore, an aspect of the present invention enables the user, before downloading rendering software for presenting multi-media messages using an animated entity, to request a preview of the multi-media message streamed to the client as a video and presented on a player such as the Microsoft Mediaplayer® or Real Player®. If the user so desires, he or she can then download the rendering software for enjoying the reception of multi-media messages.

Figure 6:
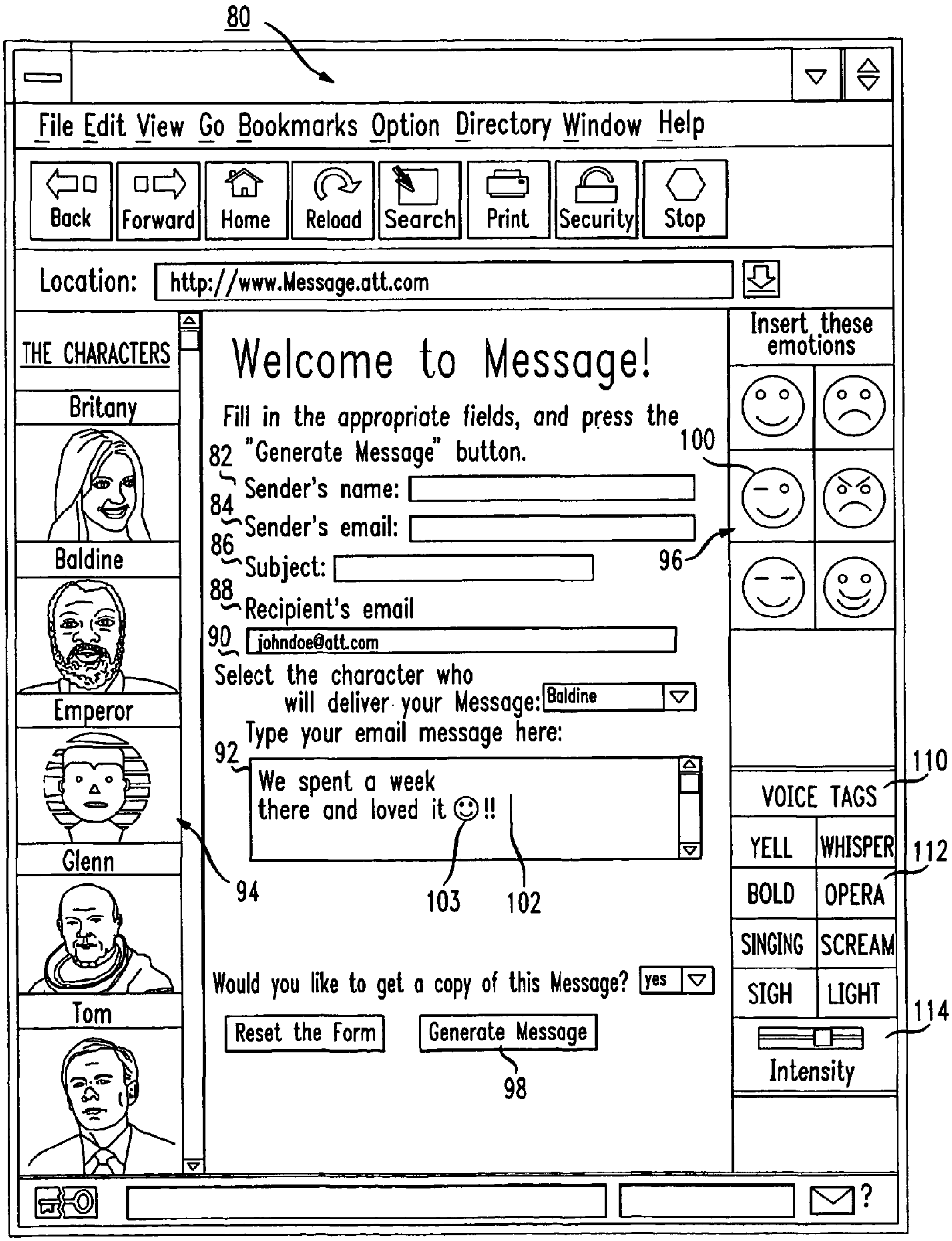
FIG. 6 illustrates an example multi-media message creation window with a configuration to enable a sender to choose options for creating a multi-media message.

FIG. 6 shows an example of a template for the sender to use to create a multi-media message. A message-creation window 80 includes basic e-mail-related features such as fields for inserting a sender name 82 and sender e-mail address 84. A subject line 86 and recipient address field 88 are also provided. The sender enters the text of the message within a standard text field 92. Various animated entities 94 are available from which the sender may choose (90) for delivering the message. Typically the animated entities are faces as shown in FIG. 6, but they may be any entity such as an animal, car, tree, robot, or anything that may be animated.

The sender may also insert emoticons 103 into the text of the message. The system includes predefined emoticons 96, such as ":-)" for a smile, "::-)" for a head nod, "*w*" for an eye wink, and so forth. The predefined emoticons are represented either as icons or as text, such as ";-)". As shown in FIG. 6, the window 80 includes a sample group of emoticon icons 96. The sender inserts an emoticon into a text message at the location of the cursor 102 by clicking on one of the emoticon icons 100. The sender may also type in the desired emoticon as text. Emoticon icons 96 save the sender from needing to type three keys, such as ":" and "-" and ")" for a smile. The icons 96 may be either a picture of, say, a winking eye or a icon representation of the characters ";-)" 100, or other information indicating to the sender that clicking on that emoticon icon will insert the associated emotion 103 into the text at the location of the cursor 102.

Once the sender composes the text of the message, chooses an animated entity 94, and inserts the desired emoticons 103, he or she generates the multi-media message by clicking on the generate message button 98. The animation server 68 creates an animated video of the selected animated entity 94 for audibly delivering the message. The TTS server 66 converts the text to speech as mentioned above. Emoticons 103 in the message are translated into their corresponding facial expressions such as smiles and nods. The position of an emoticon 103 in the text determines when the facial expression is executed during delivery of the message.

Execution of a particular expression preferably occurs before the specific location of the emoticon in the text. This is in contrast to the LifeFX™ system, discussed above, in which the execution of the smile emoticon in the text "Hello, Jonathan :-) how are you?" starts and ends between the words "Jonathan" and "how". In the present invention, the expression of the emoticon begins a predefined number of words or a predefined time before the emoticon's location in the text. Furthermore, the end of the expressions of an emoticon may be a predefined number of words after the location of the emoticon in the text or a predetermined amount of time after the location of the emoticon.

For example, according to an aspect of the present invention, the smile in the sentence "Hello, Jonathan :-) how are you?" will begin after the word "Hello" and continue through the word "how" or even through the entire sentence. The animated entity in this case will be smiling while delivering most of the message—which is more natural for the recipient than having the animated entity pause while executing an expression.

Furthermore, the starting and stopping points for executing expressions will vary depending on the expression. For example, a wink typically takes a very short amount of time to perform whereas a smile may last longer. Therefore, the starting and stopping points for a wink may be defined in terms of 0.1 seconds before its location in the text to 0.5 seconds after the location of the wink emoticon in the text. In contrast, the smile emoticon's starting, stopping, and duration parameters may be defined in terms of the words surrounding the emoticons.

FIG. 6 also illustrates a presentation of a menu of voice emoticons 110 available to the sender. These include such effects as yelling, whispering, speaking boldly, opera (112), singing, screaming, sighing and light. These are shown by way of example only. Other effects are contemplated as well. These voice emoticons 110 may also be inserted in the text similar to the emoticons 96 discussed above. The voice emoticons, however, effect the voice according to the chosen effect. As an example, if the sender selects the yelling voice emoticon, the voice of the animated entity as it delivers the message will yell for a predetermined and adjustable period of time before and after the inserted voice emoticon. The emoticon may take the form of the following: <<yell>>. An intensity bar 114 provides the sender an opportunity to tune the effect of an inserted voice emoticon. In a variation, if the sender inserts voice emoticons, the system uses that information to not only modify the audio from the animated entity but also the movements of the automated entity such as the mouth movements or the facial expressions. In this context, the modification of the voice changes the way the animated entity moves the mouth in order to pronounce words. As an example, the modification of the voice to yelling will result into more articulated mouth motion. Further, the modification of the voice to yelling will further require an additional change in the facial expression, the shape of the eyes, color of the skin, position of the eyebrows, etc. In this manner, the use of voice emoticons will further be enhanced in the multi-media presentation for a more genuine effect.

Figure 7:
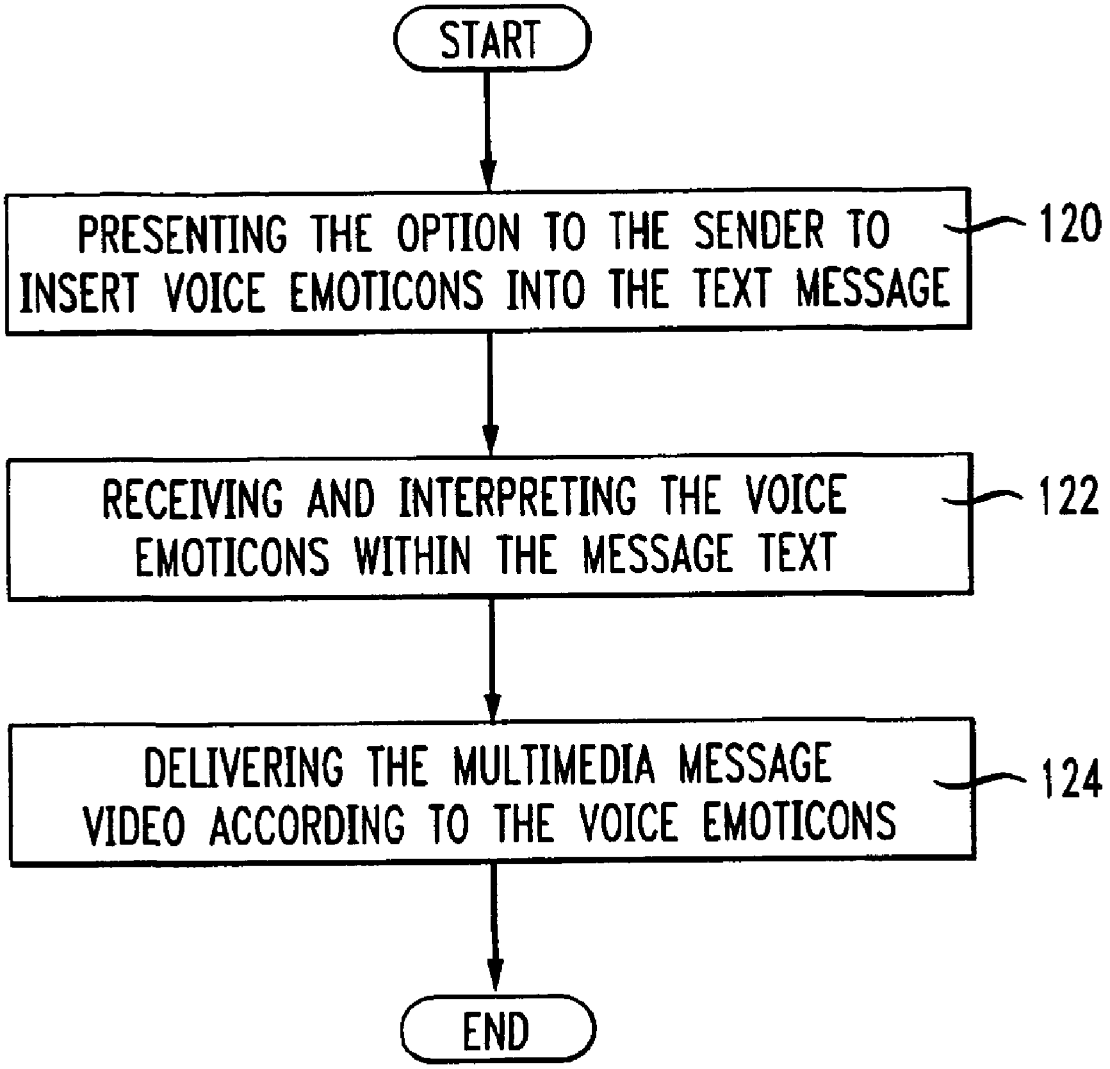
FIG. 7 illustrates an example method of providing a sender with an option to insert voice emoticons for controlling the voice used to deliver the multi-media message.

FIG. 7 illustrates an embodiment of the invention related to a method of customizing a voice in a multi-media message created by a sender for a recipient. The multi-media message comprises a text message created by the sender to be delivered by an animated entity. The animated entity has a voice associated with it that may be either the predetermined voice or a separate voice chosen by the sender. The present invention enables the sender to choose variations on the voice as the message is being delivered.

The method comprises presenting the option to the sender to insert voice emoticons into the text message associated with parameters of a voice used by the animated entity to deliver the text message (120). The sender throughout the composition of the message may insert voice emoticons that are received and interpreted by the system (122). The server delivers the multi-media message wherein the voice of the animated entity is modified throughout the message according to the voice emoticons (124).

The voice emoticons comprise emoticons associated with voice stress, volume, pause, yelling, whispering, singing, opera-style singing, sadness, cheerfulness, a sigh, a sinister mood, and more. The effect of the voice emoticons may begin a predetermined number of words immediately preceding the respective voice emoticon and end after a second predetermined number of words following the respective voice emoticon. In this respect, suppose the sender creates the following sentence "Hey, John, why are Δ you hitting me?". The "Δ" symbol is associated with a yelling voice emoticon. Any symbol will do; this is just provided by way of illustration. In one example, the effect of the voice emoticon starts during the presentation of the multi-media message at the word "why" and ends after the word "hitting". Preferably, the symbol inserted into the text is an icon that visually represents the characteristic of the voice emoticon. For example, a "singing" voice emoticon, when inserted into the text, may be an icon of a musical note. Another example may be a "yelling" voice emoticon that looks like an open mouth.

The voice emoticons may be implicitly derived from emoticons. This is accomplished, for example, by automatically associating a background sound like "wow" to a surprise emoticon.

Other means of controlling the timing of the voice emoticons are also contemplated. A dialogue may be entered into wherein when the sender inserts a voice emoticon, a dialogue window pops up and requests information regarding when to start and stop the effect. The sender can choose either time before and after the voice emoticon, a number of words, a paragraph, or some other parameter to indicate length of the effect.

Emoticons in the text of the message usually control only the facial expression of the animated entity. In another aspect of the invention, sound tags are implicitly attached to an emoticon. For example, an emoticon for a big smile automatically creates a sound tag associated with background laughter in the audio.

Other voice volume and pitch controls are associated with the text of the message. For example, one aspect of the present invention relates to a method of customizing a voice in a multi-media message created by a sender for a recipient. The method comprises presenting the option to the sender to insert voice emoticons into the text message associated with parameters of a voice used by the animated entity to deliver the text message and delivering the multi-media message wherein the voice of the animated entity is raised to a level corresponding to a number of questions marks placed at the end of a word. In this respect, the sender usually intends to place emphasis on a question when multiple question marks are placed at the end of a sentence. In this aspect of the invention, the number of question marks is translated into a voice transition from a normal speaking voice to a higher pitch and optionally a louder sound. The transition may be linear or non-linear. The effect as the recipient listens to the message is more realistic and more in harmony with the intended effect of the sender.

The option of increasing the pitch and volume of the voice according to the number of question marks is also culturally alterable. For example, if the sentence is translated into a different language that typically lowers the pitch and volume of the voice at the end of a question, then the invention makes the appropriate adjustment such that the recipient will receive the message in a culturally appropriate manner.

In another aspect of the invention, the volume and pitch of the voice is increased at the end of a sentence according to the number of exclamation points inserted into the text by the sender. Similar to the discussion above related to question marks, this aspect of the invention provides a more realistic expression of the sender's intent when the message is delivered. Cultural changes are also automatically inserted if a language translation at the recipient's end is requested. For example, if in some cultures placing exclamation points at the end of a sentence does not require the same change in voice pattern to express the same meaning, then the appropriate culture's voice pattern is expressed when the recipient receives the message.

Figure 8:
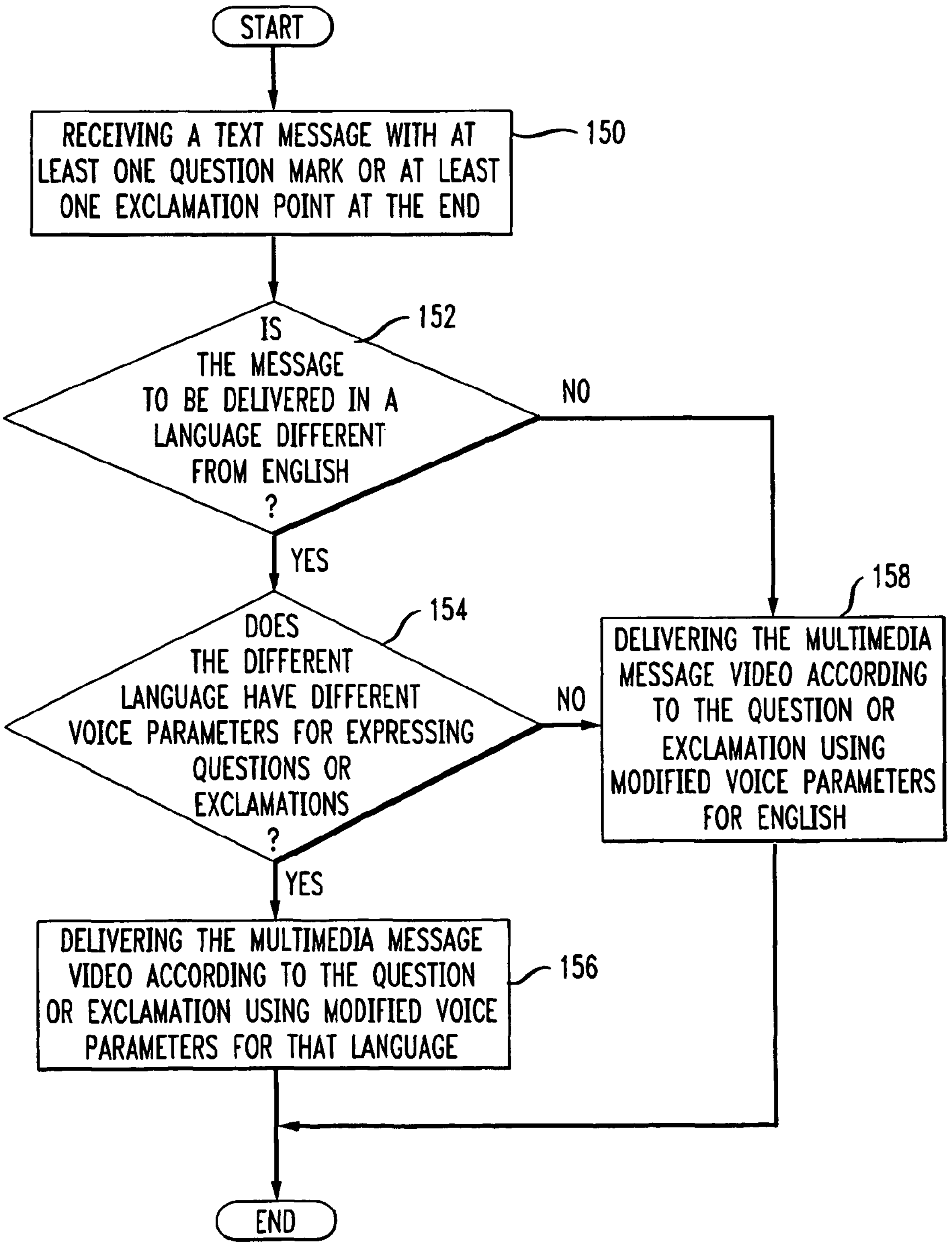
FIG. 8 shows an example method of determining the language in which the message will be delivered and provide appropriate voice controls for questions and exclamations for the chosen language.

FIG. 8 illustrates a method according to the present inventor for changing voice parameters when question marks or exclamation points are provided. The method comprises receiving a text message with at least one question mark or at least one exclamation point at the end (150). Typically a web server or other server controlling the multi-media message creation and delivery will receive the text message created by the sender. The process determines whether the message is to be delivered in a language different from English (152). The sender or the recipient may request that the message be delivered in a language other than English. This option is typically received via a button on the dialogue windows optionally chosen by the sender or the recipient. A database of available languages is stored on a computer server with associated parameters indicating voice parameter modifications for each language for questions and exclamations.

If the message delivery language differs from English, then the process determines whether the different language requires different voice parameters for expressing questions or exclamations (154). If the chosen language uses different parameters from English for expressing questions and exclamations, then according to this aspect of the invention, the multi-media message is delivered according to the question or exclamation using modified voice parameters for that language (156). If the chosen language does not have different parameters from English, then the multi-media message is delivered according to the question or exclamation using modified voice parameters for English (158). The transition of the voice parameters due to the insertion of exclamation points may be linear or non-linear.

In another aspect of the invention, the sender is presented with a template of sound icons where each sound icon is associated with a prerecorded sound, and where the template enables the sender to insert the respective sound associated with the sound icon at a chosen position in the text message. The available sound icons preferably have a consistent appearance to them such that when viewing the text message with sound icons as well as other potential icons such as emoticons or voice parameter icons, the sound icons are distinguishable.

Figure 9:
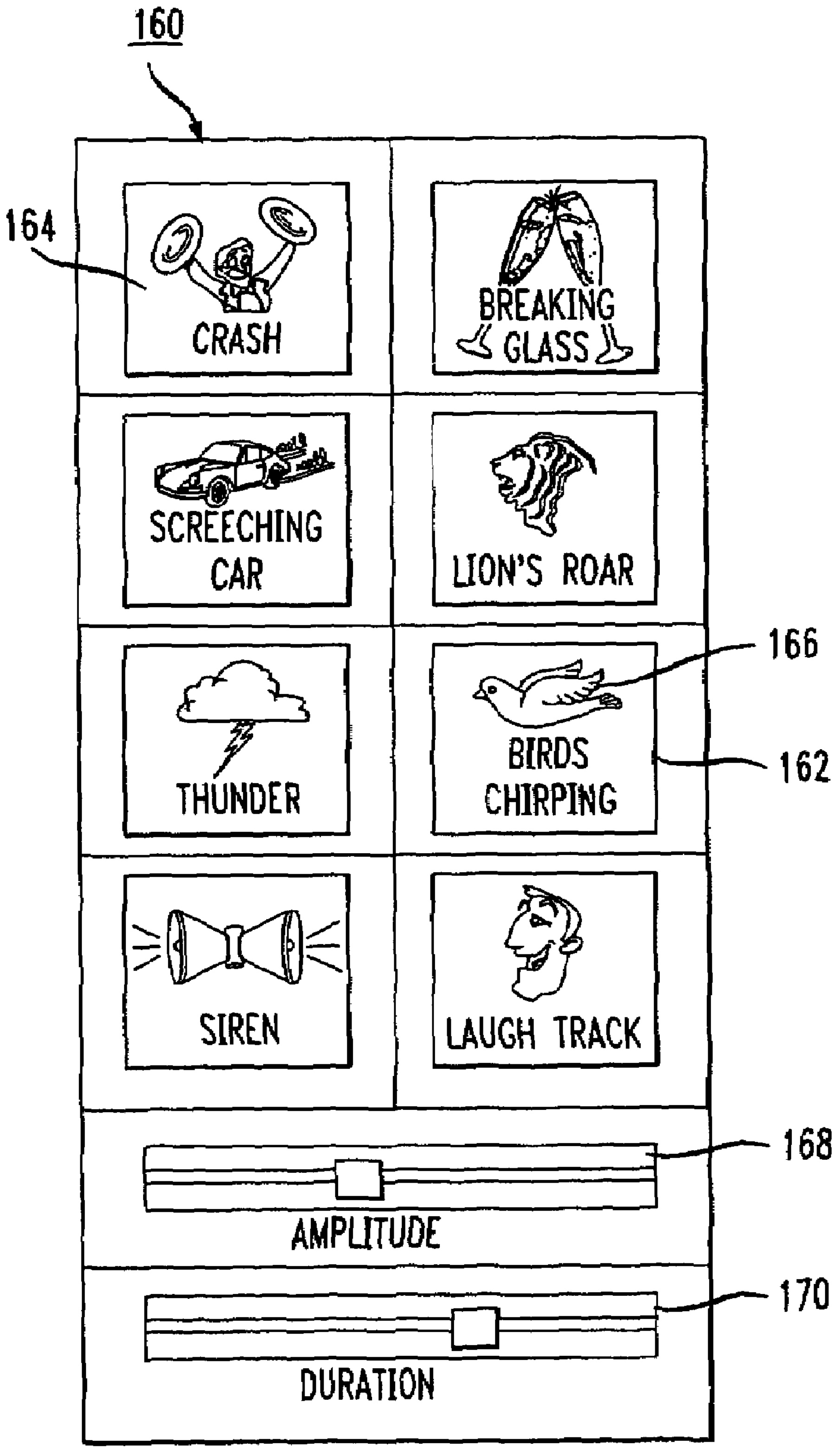
FIG. 9 shows an example of a template for choosing sounds for insertion into the text of the multi-media message.

FIG. 9 illustrates a sound icon template 160 that is available either directly on the window 80 shown in FIG. 6 or available via a menu option chosen by the sender. The template 160 includes sound icons such as "birds chirping" 162 and "crash" 164. Any variety of sound may be available to the sender, both prerecorded and received from the sender, for use in the template. The sound icons may include visual depictions of the sound, such as a bird 166, on the icon for birds chirping. The sound icons, when chosen, are inserted at the location of the curser in the text message and preferably include the depiction of the sound such that when viewing the message the sender will easily remember and understand the location and effect of the inserted sound icons. The sender may also choose an amplitude 168 with each inserted sound icon. Sounds received from the sender may be stored in a private or a public database.

Once the message is composed and any sound icons are inserted, the method comprises delivering the multi-media message with the associated sounds chosen by the sender with the intensity or amplitude chosen by the sender for each sound. The intensity or amplitude of the sound icon may also be requested by repeating the sound icon within the text of the message. For example, if the sender inserts three "crash" 164 icons in a row, then the sound of the crash is intensified.

The sender may also choose the duration of the sound tags, either through a duration option 170 in the template 160 or through duration tags inserted by the sender wherein a starting point and a stopping point for a particular sound may be specified at particular locations within the text. Preferably, when start and stop tags are used, they relate to the starting and stopping of a sound icon inserted between the start and stop tags. The server controlling and interacting with the sender to receive commands and the created multi-media message may review the text of the message to insure that start and stop tags match and that an identified sound icon is associated with start and stop tags. An error message is provided to the sender to review the message if ambiguity exists.

Figure 10:
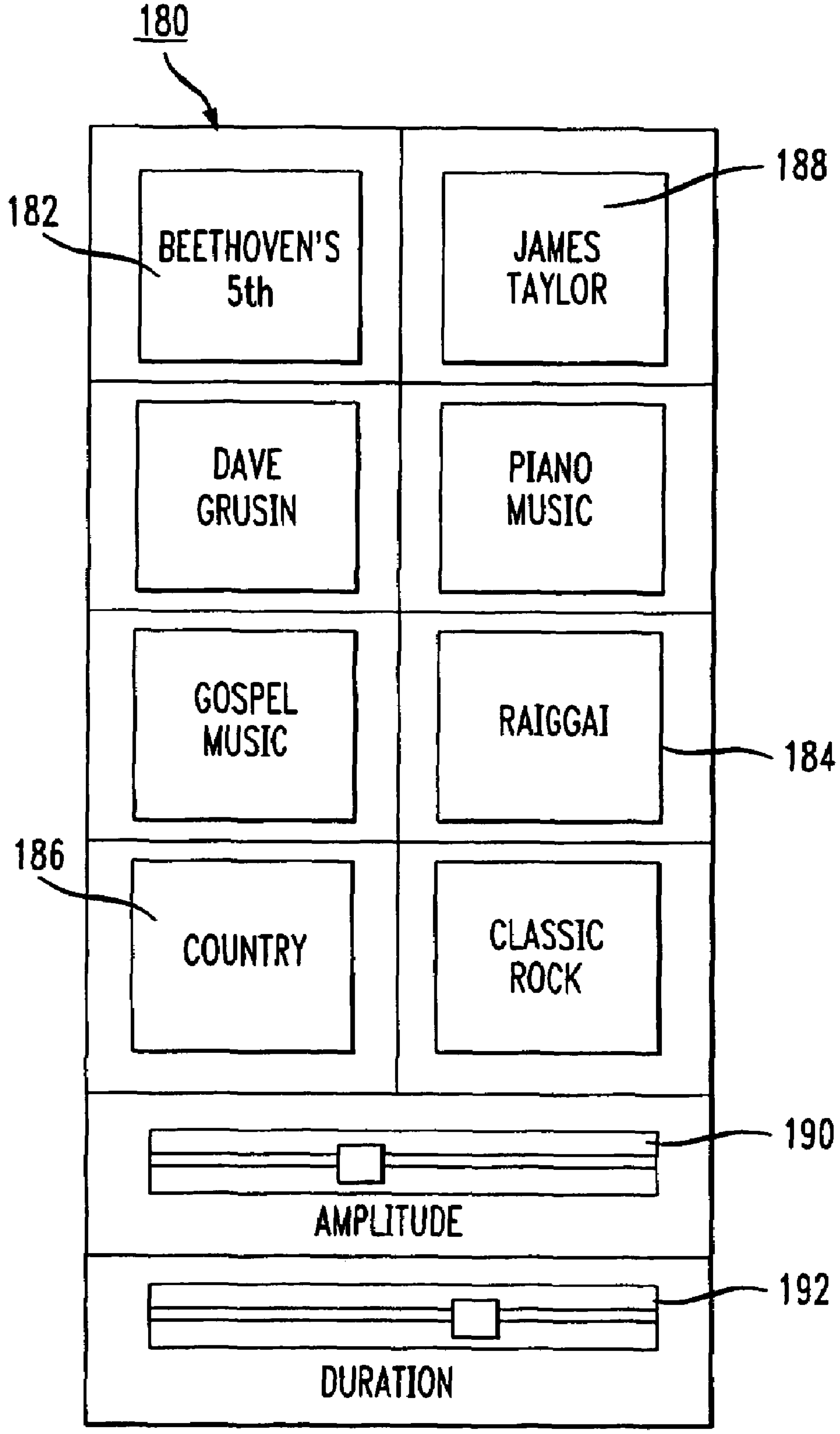
FIG. 10 illustrates an example template used for choosing audio tracks for inserting into the text of the multi-media message.

FIG. 10 illustrates yet another potential music template 180 available to the sender. This template includes audio tracks and icons associated with the tracks. The tracks may be organized in any manner including by specific piece, such as Beethoven's $5^{th}$ 182, by general description of music, such as Reggai 184 or Country 186, or by artist, such as James Taylor 188. Amplitude adjustments 190 and duration adjustments 192 are also available to the user via the template or via start and stop tags inserted for controlling the starting point and specific stopping point of musical selections. Using the amplitude option, the music may be soft, as background music, or louder for any effect desired by the sender.

Various audio track tags may also be chosen by the sender to further enhance the presentation of the audio tracks. These tags (not shown) may relate to, for example, duration, intensity, looping (automatic replay of selection), mixing, volume, or tempo. Once the audio track is inserted and any tags or other parameter controls of the audio track are inserted by the sender, the method according to this aspect of the invention comprises delivering the multi-media message with audio tracks according to the audio track tags inserted within the text message by the sender.

Such audio tracks may also be available to the sender via a predefined multi-media message template. Such a template may comprise, for example, a specific background image and background audio tracks predefined according to a general tone the sender wishes to convey in the multi-media message. For example, a love letter may comprise soft music with a background image of a beach at sunset. The chosen animated entity may also have a predefined voice and face to match the template. The sender can choose the template with these parameters, modify any of the parameters to further personalize the template, and then send the multi-media message to the recipient. In this regard, the computer server interacting with the sender to create the multi-media message will present to the sender options to modify or control any of the parameters associated with the chosen template. With the received responses from the sender and the sender message, the multi-media message is created and delivered.

A variation on the invention relates to a method of customizing audio effects in a multi-media message wherein the server presents to the sender at least one multi-media message template wherein the sender may choose audio effects for the multi-media message. The audio effects may relate to background music or sounds or specific audio variations for the voice used to deliver the text message. Any variety of audio modification may be available through the template for the sender. The sender also inputs the text of the message. The server presents to the sender an audio-only preview of the multi-media message. This enables the sender to simply listen to the sound effects that have been created. Upon approval of the audio-only preview from the sender, the system delivers the multi-media message to the recipient.

Examples of the audio parameters available to the sender either through a template or through sound icons comprise, but are not limited to, sounds before a first word of the text message is delivered, predefined voice intensity and volume, sounds provided during delivery of the text message, sounds provided at the end of the text message and voice modification as the text message ends.

Although the above description may contain specific details, they should not be construed as limiting the claims in any way. Other configurations of the described embodiments of the invention are part of the scope of this invention. For example, the present invention is described in the context of an e-mail system. However, the general concepts described herein are applicable to any message delivery system such as instant messaging or portable wireless device communications. Furthermore, the basic principles of the present invention may be applied to any regular speech synthesizer such that a multi-media message may comprise just audio. Accordingly, the appended claims and their legal equivalents should only define the invention, rather than any specific examples given.

We claim:

1. A computer-readable medium storing instructions for controlling a computing device to customize a voice in a multi-media message created by a sender for a recipient, the multi-media message comprising a text message from the sender to be delivered by an animated entity, the instructions comprising:

receiving from the sender inserted voice emoticons, which may be repeated, into the text message associated with parameters of a voice used by an animated entity to deliver the text message; and transmitting the text message such that a recipient device can deliver the multi-media message at a variable level associated with a number of times a respective voice emoticon is repeated.

2. The computer-readable medium of claim 1, wherein the voice emoticons comprise emoticons associated with at least one of voice stress, volume, pause, and emotion.

3. The computer-readable medium of claim 1, wherein the voice emoticons are implicitly derived from emoticons.

4. The computer-readable medium of claim 2, wherein an effect of the voice emoticons within the text message begins with a word immediately following the respective voice emoticon.

5. The computer-readable medium of claim 1, wherein the recipient device can further deliver the multi-media message such that the animated entity is modified throughout the message according to the voice emoticons.

6. The compute-readable medium of claim 1, wherein the instructions further comprise receiving from the sender duration tags associated with inserted voice emoticons, wherein the recipient device may deliver the message with durations associated with the received duration tags.

7. A computer-readable medium storing instructions for controlling a computing device for customize a voice in a multi-media message created by a sender for a recipient, the multi-media message comprising a text message from the sender to be delivered by an animated entity, the instructions comprising:

receiving from a sender an insert of a voice volume emoticon into a text message associated with a voice used by an animated entity to deliver the text message, wherein the voice volume emoticon may be repeated to amplify of the effect of the voice volume emoticon and wherein a recipient device can delivery the multi-media message with the voice of the animated entity modified throughout the message according to the voice volume emoticon.

8. The computer-readable medium of claim 7, wherein the voice volume emoticon comprises one of a voice volume increase emoticon and a voice volume decrease emoticon.

9. The computer-readable medium of claim 8, wherein repeated use of a voice volume decrease emoticon results in the animated entity whispering a portion of the text message.

10. The computer-readable medium of claim 8, wherein repeated use of a voice volume increase emoticon results in the animated entity yelling a portion of the text message.

11. A computer-readable medium storing instructions for controlling a computing device to customize a voice in a multi-media message created by a sender for a recipient, the multi-media message comprising a text message from the sender to be delivered by an animated entity, the instructions comprising:

receiving from a sender an insert of a voice emoticon into the text message associated with parameters of a voice used by the animated entity to deliver the text message, wherein a recipient device can deliver the multi-media message such that the voice of the animated entity is modified according to a number of punctuation marks placed at the end of a word.

12. The computer-readable medium of claim 11, wherein the voice of the animated entity is modified by increasing an amplitude of the voice of the animated entity linearly to the number of punctuation marks added to the end of the word.

13. The computer-readable medium of claim 11, wherein the punctuation marks are at least one of question marks and exclamation points.

14. The computer-readable medium of claim 13, wherein if the punctuation marks are question marks, then the voice of the animated entity is modified to make it sound like a question is being asked.

15. A computing device that customizes a voice in a multi-media message created by a sender for a recipient, the multi-media message comprising a text message from the sender to be delivered by an animated entity, the computing device comprising:

a module configured to receive from the sender inserted voice emoticons, which may be repeated, into the text message associated with parameters of a voice used by an animated entity to deliver the text message; and a module configured to transmit the text message such that a recipient device can deliver the multi-media message at a variable level associated with a number of times a respective voice emoticon is repeated.

16. The computing device of claim 15, wherein the voice emoticons comprise emoticons associated with at least one of voice stress, volume, pause, and emotion.

17. The computing device of claim 15, wherein the voice emoticons are implicitly derived from emoticons.

18. The computing device of claim 15, wherein an effect of the voice emoticons within the text message begins with a word immediately following the respective voice emoticon.

19. The computing device of claim 15, wherein the recipient device can further deliver the multi-media message such that the animated entity is modified throughout the message according to the voice emoticons.

20. The computing device of claim 15, further comprise a module configured to receive from the sender duration tags associated with inserted voice emoticons, wherein the recipient device may deliver the message with durations associated with the received duration tags.

* * * * *